United States Patent

Jensen

[15] 3,665,777
[45] May 30, 1972

[54] ENERGY ABSORBING STEERING COLUMN

[72] Inventor: Finn Benzon Jensen, Dearborn, Mich.
[73] Assignee: Ford Motor Company, Dearborn, Mich.
[22] Filed: Dec. 15, 1969
[21] Appl. No.: 885,159

[52] U.S. Cl. ............................................74/492, 287/58 CT
[51] Int. Cl. .............................................................B62d 1/18
[58] Field of Search ................74/490, 492, 493; 287/58 CT

[56] References Cited

UNITED STATES PATENTS

| 1,664,669 | 4/1928 | Denyes | 74/490 |
| 3,373,629 | 3/1968 | Wight et al. | 74/492 |
| 3,373,630 | 3/1968 | Heurtebise | 74/492 |

Primary Examiner—Milton Kaufman
Attorney—John R. Faulkner and Roger E. Erickson

[57] ABSTRACT

A steering column assembly including an energy absorbing outer jacket and a telescopically collapsible steering shaft. The shaft has a resilient friction member separating the inner and outer shaft components. The friction member is radially compressed between the two components to maintain the relative axial position of the shaft components and to prevent audible vibration between the components.

1 Claim, 7 Drawing Figures

Patented May 30, 1972
3,665,777
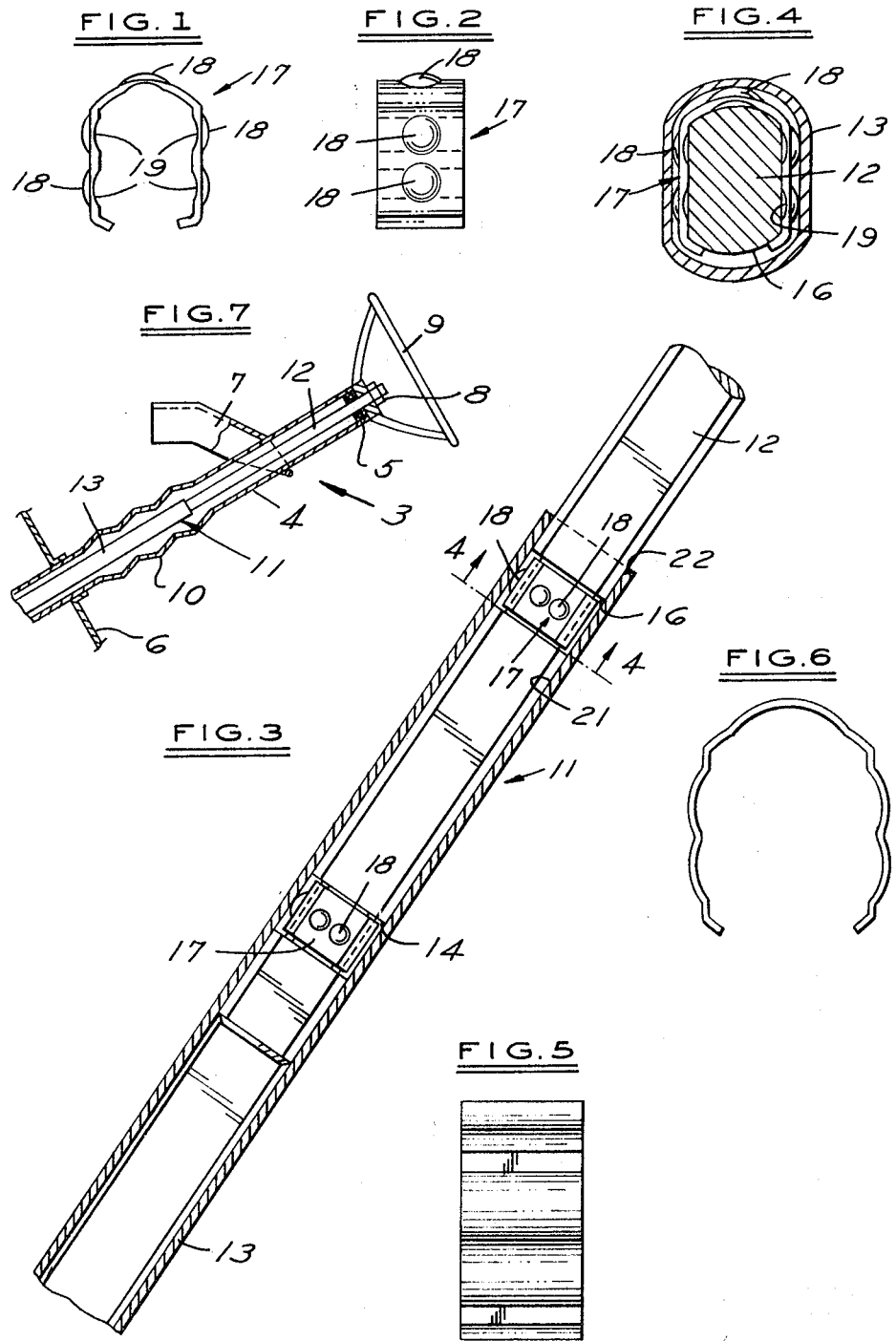
INVENTOR
FINN BENZON JENSEN
BY John R. Faulkner
Roger L. Erickson
ATTORNEYS

3,665,777

ENERGY ABSORBING STEERING COLUMN

BACKGROUND OF THE INVENTION

Present day motor vehicles generally include steering column assemblies which are deformable or collapsible to absorb energy at a controlled rate. As a part of such a column assembly, the steering shaft must also be axially collapsible. Numerous designs have been proposed and utilized for collapsible columns, many of which have been subject to noisome vibrations and eventual loosening.

This invention provides a collapsible steering column assembly in which audible vibrations between the telescoping components is prevented. Further, the invention provides components which are easy to assemble and adjust and which retain a tight fit throughout the life of the vehicle.

SUMMARY OF THE INVENTION

A steering column assembly constructed in accordance with this invention includes an energy absorbing outer jacket and a collapsible steering shaft. The steering shaft comprises an inner shaft component telescopingly received within a hollow outer shaft component. The inside surface of the outer shaft component and the outside surface of the inner shaft component have corresponding non-circular shapes capable of transmitting torques between the first and second components. A resilient friction member is compressed into a peripheral groove of the inner shaft component and frictionally engages the inside surface of the outer shaft component to maintain the relative axial position of the steering shaft components during normal operation of the vehicle.

BRIEF DESCRIPTION OF THE DRAWINGS

FIG. 1 is an axial elevational view of the friction member;

FIG. 2 is a side elevational view of the friction member;

FIG. 3 is a side view, partially in section and partially in elevation of the steering shaft assembly;

FIG. 4 is a cross sectional view along line 4—4 of FIG. 3;

FIG. 5 is an axial elevational view of an alternate embodiment of the friction member constructed of spring steel;

FIG. 6 is a side elevational view of the friction member of FIG. 5; and

FIG. 7 is a side elevational view with some components in section of the steering column assembly of the invention.

DETAILED DESCRIPTION OF A PREFERRED EMBODIMENT

A steering column assembly 3 is shown in FIG. 7 that includes an energy absorbing outer jacket 4 and a telescopingly collapsible steering shaft assembly 11. A bearing 5 supports the upper end of the steering shaft assembly within the outer jacket. The column assembly is supported by a toe plate 6 near its lower end and by a bracket 7 mounted to the vehicle body. A steering wheel 9 is secured to the upper end of the steering shaft assembly by a threaded fastener 8.

The outer jacket 4 is generally cylindrical and includes a plurality of circumferential pleats or folds 10. The folds may be slotted or perforated (not shown) to achieve a desired energy absorption characteristic. A force applied to the steering wheel 9, if of sufficient magnitude will cause the pleated portion of the outer jacket to be axially compressed between the steering wheel and the toe plate 6 and will telescopingly collapse the steering shaft assembly 11 a corresponding amount.

A portion of the collapsible steering shaft assembly 11 is shown in FIG. 3 of the drawings. An inner shaft component 12 is slidingly and telescopingly received within an outer, hollow shaft component 13. The cross sectional shape of the components is non-circular as shown in FIG. 4 so as to be capable of transmitting a torque. A pair of grooves 14 and 16 are formed in the inner shaft component. The grooves are uniform in depth and extend about the periphery of the shaft component.

A pair of resilient friction members 17 are received in grooves 14 and 16. The friction members are of a slightly closed U-shape as shown in FIGS. 1 and 4. A number of generally spherical bulges 18 extend outwardly from the remainder of the member. A corresponding number of generally cylindrical recesses 19 are also formed approximately opposite the bulges 18.

When the friction member 17 is within one of grooves 14 and 16, but before assembly of the inner and outer shaft components 12 and 13, the maximum cross sectional dimensions of the friction members 17 exceed the inside opening 21 dimensions of the outer shaft component 13. Upon assembly of the components the friction member is compressed between the inside opening 21 of the outer component and the groove 16 to provide a continually tight fit. A small chamfer 22 on the end of the outer shaft component aids in assembly.

The friction member 17 is preferably of a molded plastic construction, but could be fabricated from any suitable resilient material. FIGS. 5 and 6 illustrate an alternate embodiment made of spring steel.

Further modifications will occur to those skilled in the art which are included within the following claims.

I claim:

1. A steering column assembly comprising:

an outer jacket and controlled deformation energy absorbing means, means to attach the steering column assembly to the body of an automotive vehicle, a telescopingly collapsible steering shaft assembly, means to rotatably support said steering shaft assembly within said outer jacket, a steering wheel mounted to the upper end of steering shaft assembly, said steering shaft assembly including a hollow outer shaft component, an inner shaft component slidably received within said outer shaft component, said inner and outer shaft components having complementary cross sectional shapes capable of relative axial movement and of transmitting a torque therebetween, the cross sectional shape of the inner shaft component and the outer shaft component inner periphery being generally circular with two parallel chordal sections removed, a circumferentially extending groove formed in the outer surface of the inner shaft component having a uniform depth and width, a resilient friction member received in said groove which when the shaft components are unassembled has certain cross sectional dimensions larger than the outer shaft component inner opening and which when the components are assembled is resiliently compressed therebetween, said resilient friction member having generally a U-shape, portions of said friction member bowing outwardly from said groove into engagement with said outer shaft component, said friction member comprising an elastically deformable material which is compressed into said groove as the inner shaft component is positioned within the outer shaft component, said friction member being slidable relative to the outer shaft component to permit axial movement of the inner shaft component relative to the outer shaft component, said energy absorbing means being constructed to permit the axial displacement of a portion of said outer jacket and said steering wheel and for said shaft components to telescope when a load above a preestablished minimum is applied against said steering wheel.

* * * * *